(12) United States Patent
Petro et al.

(10) Patent No.: US 8,319,144 B2
(45) Date of Patent: Nov. 27, 2012

(54) APPARATUS AND METHOD FOR CONSTRUCTING THREE-DIMENSIONAL LAMINATED SHAPES FOR FIELD POLE STRUCTURES

(75) Inventors: John Patrick Petro, Los Altos, CA (US); Jeremy Franz Mayer, Mountain View, CA (US)

(73) Assignee: Novatorque, Inc., North Highlands, CA (US)

( * ) Notice: Subject to any disclaimer, the term of this patent is extended or adjusted under 35 U.S.C. 154(b) by 1016 days.

(21) Appl. No.: 12/334,929

(22) Filed: Dec. 15, 2008

(65) Prior Publication Data

US 2009/0152249 A1 Jun. 18, 2009

Related U.S. Application Data

(60) Provisional application No. 61/014,256, filed on Dec. 17, 2007.

(51) Int. Cl.
*B23K 26/00* (2006.01)
*B23K 26/14* (2006.01)

(52) U.S. Cl. ............... 219/121.64; 219/121.67

(58) Field of Classification Search ... 219/121.6–121.83
See application file for complete search history.

(56) References Cited

U.S. PATENT DOCUMENTS

| | | |
|---|---|---|
| 6,455,975 B1 | 9/2002 | Raad et al. |
| 7,297,896 B2 * | 11/2007 | Biunno et al. ........... 219/121.69 |
| 7,385,157 B2 * | 6/2008 | Oda et al. ............... 219/121.63 |
| 2006/0123622 A1 | 6/2006 | Guy |
| 2007/0200452 A1 | 8/2007 | Graham et al. |

OTHER PUBLICATIONS

PCT/US08/86828 ISR-WO, Feb. 4, 2009, Novatorque, Inc.
Chinese Patent Appln. No. 200880120606.1 filed Jun. 12, 2010. Applicant Novatorque, Inc. Office Action dated Oct. 10, 2011.

* cited by examiner

*Primary Examiner* — Sang Paik
(74) *Attorney, Agent, or Firm* — Cooley LLP

(57) ABSTRACT

A method for constructing a three-dimensional laminated shape includes selecting a first lamination strip from a plurality of lamination strips with different widths assembled on a spool. The first lamination strip is stacked on a stacking device and is cut at a first lamination length. A second lamination strip is selected from the spool. The second lamination strip is stacked and cut at a second lamination length different than the first lamination length. The process is repeated to construct a three-dimensional laminated shape of an electrodynamic device. In another embodiment, a computer readable storage medium includes executable instructions to collect design information characterizing a three-dimensional laminated shape and compute lamination parameters based on the design information. The computer readable storage medium further includes executable instructions to direct a plurality of components to construct a three-dimensional laminated shape of an electrodynamic device based on the lamination parameters. The three-dimensional laminated shape comprises a plurality of lamination strips of different lamination widths and different lamination lengths.

16 Claims, 9 Drawing Sheets

APPARATUS AND METHOD FOR CONSTRUCTING THREE-DIMENSIONAL LAMINATED SHAPES FOR FIELD POLE STRUCTURES

CROSS REFERENCE TO RELATED APPLICATION(S)

This application claims the benefit of U.S. Provisional Application No. 61/014,256 entitled "Apparatus and Method for manufacturing three-dimensional field poles" filed on Dec. 17, 2007, which is incorporated herein by reference in its entirety.

FIELD OF THE INVENTION

The present invention relates generally to techniques for forming laminations for electro magnetic devices and more particularly to an apparatus and method for constructing a three-dimensional laminated shape for a field pole structure in an electrodynamic device.

BACKGROUND OF THE INVENTION

There are a number of known approaches to construct three-dimensional field pole assemblies for electrodynamic machines. These approaches typically utilize strip shearing techniques with traditional interlocking parts or continuous bar production techniques. Techniques also exist that press field pole assemblies out of soft magnetic composites (SMC). However, these techniques are typically expensive to implement and/or generally result in poor performance of the electrodynamic machine.

While traditional stamping techniques may be used to construct laminated structures for field pole assembles, the tooling costs and material scrap rates are prohibitive. It would be desirable to develop a technique by which three-dimensional laminated field pole structures in electrodynamic machines can be constructed in a cost effective manner. In addition, it would be desirable to develop a technique to construct a wide range of three-dimensional field pole shapes and sizes.

SUMMARY OF THE INVENTION

In one embodiment, a method for constructing a three-dimensional laminated shape includes selecting a first lamination strip from a plurality of lamination strips with different widths assembled on a spool. The method includes stacking and cutting the first lamination strip at a first lamination length. The method further includes selecting a second lamination strip from the spool, which is stacked and cut at a second lamination length different than the first lamination length. The first lamination strip and the second lamination strip form a portion of a three-dimensional laminated shape of an electrodynamic device.

In another embodiment, a computer readable storage medium includes executable instructions to collect design information characterizing a three-dimensional laminated shape and compute lamination parameters based on the design information. The computer readable storage medium further includes executable instructions to direct a plurality of components to construct a three-dimensional laminated shape of an electrodynamic device based on the lamination parameters. The three-dimensional laminated shape comprises a plurality of lamination strips of different lamination widths and different lamination lengths.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
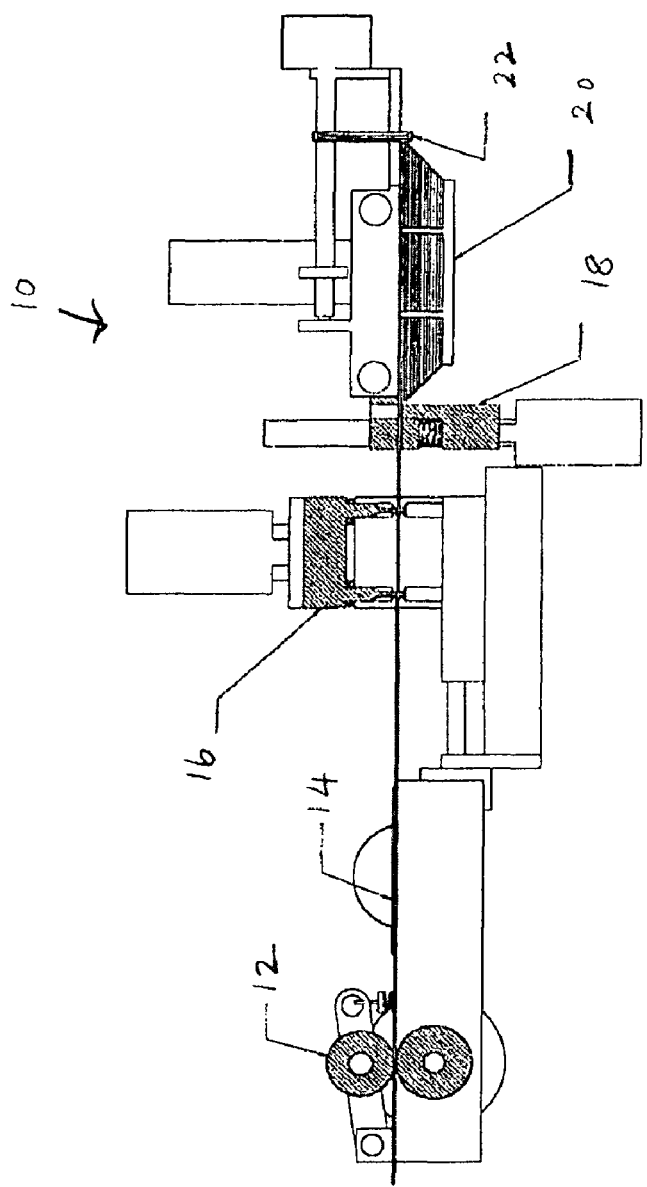
FIG. 1 is a schematic view of a die punching system for constructing a three-dimensional laminated shape, in accordance with one embodiment of the present invention.
Figure 2:
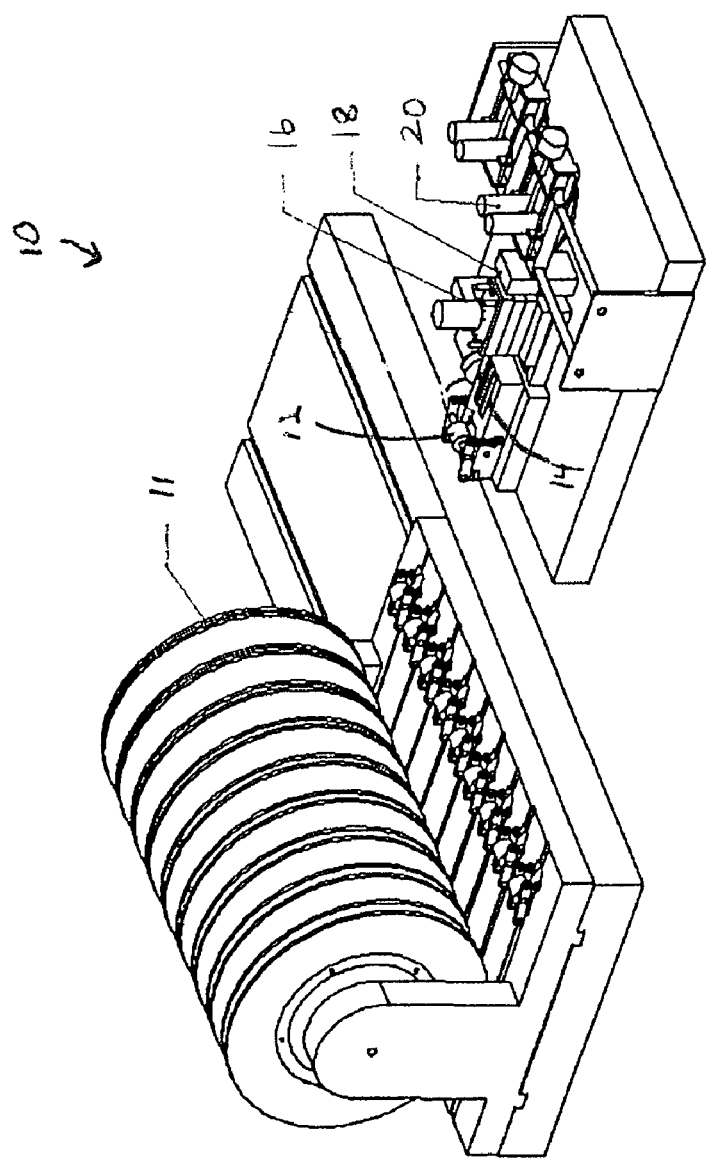
FIG. 2 illustrates an isometric solid view of the die punching system shown in FIG. 1.

FIG. 1 is a schematic view of a die punching system for constructing a three-dimensional laminated shape, in accordance with one embodiment of the present invention. FIG. 2 illustrates an isometric view of the die punching system shown in FIG. 1. In one embodiment, the disclosed die punching system is used to construct a three-dimensional laminated shape of a field pole structure in an electric motor. As used herein, the term "field pole structure" refers generally to an element composed of a magnetically permeable material and being configured to provide a structure around which a coil can be wound (i.e., the element is configured to receive a coil for purposes of generating magnetic flux). Although, the disclosed embodiments describe a technique to construct a three-dimensional laminated shape for a field pole structure, it is to be appreciated that the disclosed embodiments may also be applied to construct three-dimensional laminated shapes of other electromagnetic devices such as rotor cores, transformer cores, electromagnet cores, ignition cores, and the like.

Referring now to FIGS. 1 and 2, the die punching system 10 generally includes a spool system 11, a pinch wheel drive 12, horizontal movable guides 14, a punching station 16, a cut-off punch 18, a stacking platen 20 and a hard stop 22. The pinch wheel drive 12 typically selects one lamination strip from a set of coiled lamination strips of various widths assembled on the spool system 11. A hitch feed drive can be used as an alternative to the pinch wheel drive.

Operationally, in one embodiment, the reels in the spool system 11 are moved horizontally to allow a lamination strip having a first lamination width to be selected by the pinch wheel drive 12. Preferably, stacking features are pre-punched into the first lamination strip and the lamination strip is fed into a punching station 16. Movable horizontal width guides 14 within the die punching system 10 determine the appropriate spacing required for each lamination strip and guide the lamination strips into a proper position for punching by the punching station 16. The lamination strip is advanced to the hard stop 22 in the stacking mechanism. The stacking platen 20 is moved up to secure the position of the lamination and it is then cut by the cut-off punch 18. The lamination strip is then advanced by the pinch wheel drive 12. A second lamination strip with a lamination length that is different from the first lamination length is then processed in the same manner as the first lamination strip. However, in the case of the second lamination strip, a set of stacking features is punched onto the second lamination strip in the punching station 16. The stacking features may include, for example, through holes and/or mechanical interlocks.

The stacking platen 20 has the ability to move up and down in the vertical direction to enable the stacking of each cut lamination strip and to accommodate the accumulated stack height of the finished part as each new lamination strip is added. When holes and pins are used for stacking, the pins hold the cut lamination strip in the proper location. When interlocks are used, the stacking platen 20 has a cutout that matches the first lamination strip in structure and magnetic attraction is typically used to hold the cut lamination strip in the proper location.

The above process continues for as many lamination strips as the three-dimensional shape to be constructed needs for lamination strips having a first lamination width. When the last lamination strip having the first lamination width is stacked on the stacking platen 20, interlock tabs or stacking features are punched into the next lamination strip so that a lamination strip having the first lamination width is available the next time a lamination strip of this particular width is required. The lamination strip having the first lamination width is then withdrawn from the punching station 16 and is rolled back to the spool system 11.

A lamination strip having a second lamination width different from the first lamination width is subsequently selected by the pinch wheel drive 12 and the horizontal movable guides 14 are repositioned to guide the lamination strips having the new lamination width. The lamination strip is then advanced to the punching machine 16 and the above process is repeated for all lamination strips of this particular width that are required to construct the desired three-dimensional laminated shape.

Figure 3:
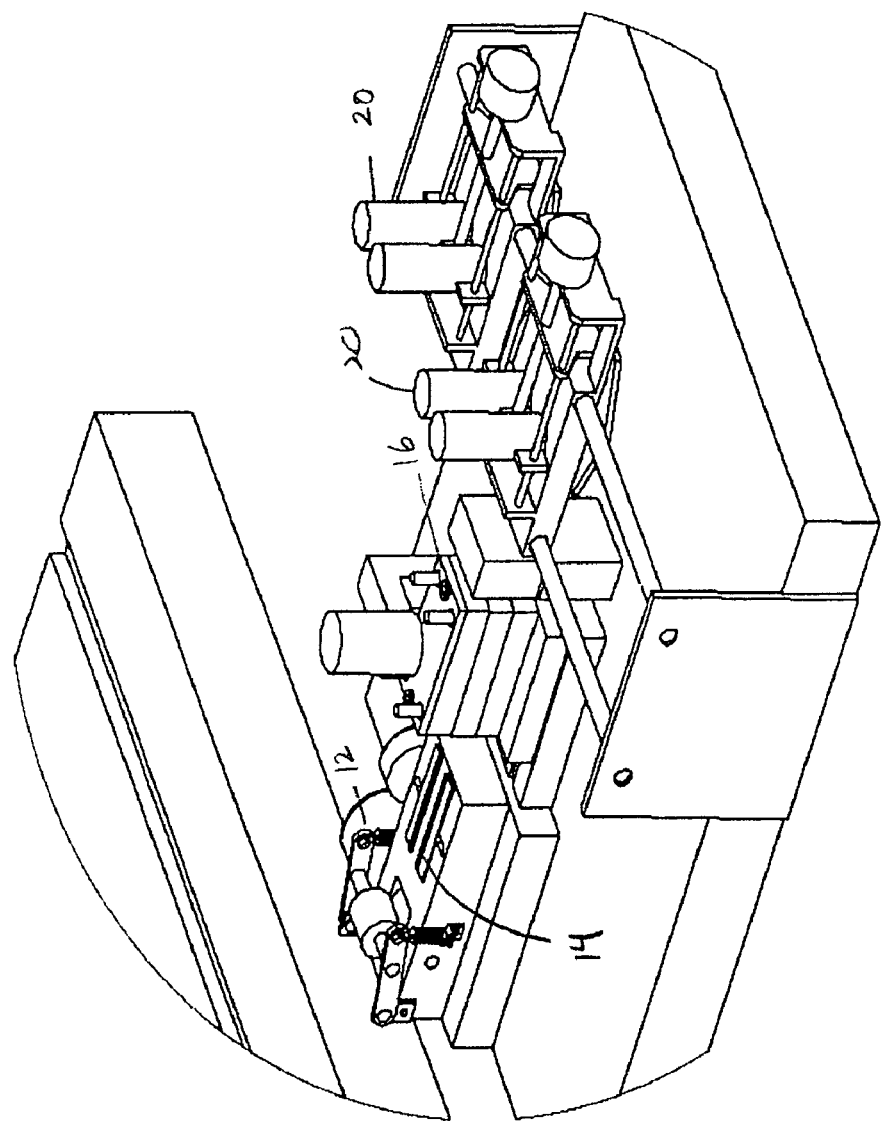
FIG. 3 illustrates components of the die punching system 10 in greater detail.

Two techniques may be used to advance a new roll of lamination stock that does not have stacking features pre-punched into it. The first technique is to insert each new roll of lamination stock into the pinch wheel drive 12, advance it to the proper stop position, pre-punch in the stacking features, cut one lamination strip without stacking features, and then return the lamination stock to the spool system 11. The cut lamination in this step may then be ejected as waste. The second technique is to allow the lamination strip to be advanced to the proper location for stamping. The remaining lamination stock is then withdrawn and reeled back onto the spool system in the pinch wheel drive 12. In one embodiment, the lamination strip may be advanced until it reaches the cut-off punch 18. The implementation of FIGS. 2 and 3 includes two identical stacking platens 20 that can move horizontally. This allows a previously completed lamination structure to be removed while a new lamination structure is being processed.

Figure 4:
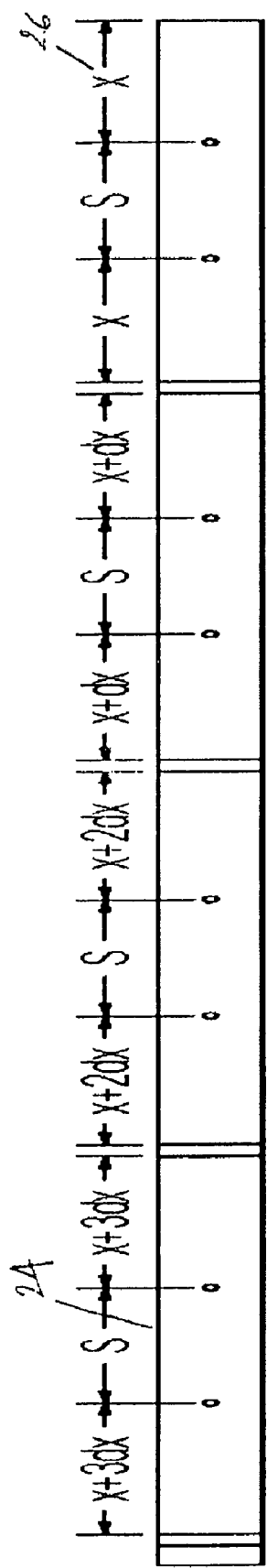
FIG. 4 illustrates a technique by which lamination lengths for a lamination strip are determined, in accordance with one embodiment of the present invention.

FIG. 4 illustrates a technique by which lamination lengths for a lamination strip are determined, in accordance with one embodiment of the present invention. In a particular embodiment, the length of each lamination strip is determined by computing the distance between the stacking features punched on the lamination strip and the cut-off point of the cut-off punch 18. In the illustrated example, the spacing between the stacking features is fixed at S 24 and the minimum distance to each end of the lamination strip is x 26. Each lamination strip increases in length by 2dx, as dx is added to each end of the strip. Observe that the length of the lamination strip increases a preset fixed amount, dx, on each successive lamination.

In one embodiment, the punching station 16 that creates the stacking features for each lamination strip is moved by a fixed amount. The mechanical hard stop 22 is configured to move the incremental difference between each lamination length. Finally, the stacking platen 20 is configured to move by a fixed amount to accommodate the progression of the position of the stacking feature with respect to the cutoff point. Specifically, as the length of a lamination strip increases a preset fixed amount, dx, on each successive lamination, the stacking feature punching station 16 moves minus dx between each successive lamination punching and the stacking platen 20 moves plus dx each time. The mechanical hard stop 22 for positioning the lamination strip moves two times dx in the positive direction during each cycle. The cutoff punch 18 is stationary and does not move. In other embodiments, the lamination length varies from lamination to lamination, provided that the lamination length is monotonically increasing.

The disclosed technique of constructing a three-dimensional laminated shape using the die punching system has several advantages. First, by starting with lamination strips with varying widths, there is very little material lost from the edges of the strips. If half punch interlock features are used, there is no material lost in this step, thereby completely utilizing all of the strip material. Even if the stacking is done with through holes and pins and a punch is used to cut the lamination strip for stacking, only a small percentage of the material is removed as scrap. This is in contrast to the 25-75 percent of material scrap generated by traditional stamping operations. Further, in one embodiment, a punching station of under 500 pounds for punching the stacking features and a cut off punch that requires less than 1000 pounds force is utilized. These relatively small forces enable the use of simple actuators to accomplish the punching operations, as compared to the large and costly stamping presses used in traditional stamping operations. In addition, since the punching and cutting operations can be performed simultaneously, the number of lamination strips that can be stacked per second is very high. Further, the disclosed technique is very flexible and can be used to construct three-dimensional structures of various shapes. Finally, the lamination material can be very thin to reduce eddy current core losses, since only two stamping operations are performed. Processing thin material using traditional stamping techniques requires costly high precision dies which are typically hard to manufacture. The dies utilized by the disclosed die punching system are typically very small and simple, thereby reducing the additional cost of the precision required to handle thin lamination material. In one embodiment, the cut off punch can be designed so that it is always attached to its associated die, thereby having a close to zero clearance.

Figure 5:
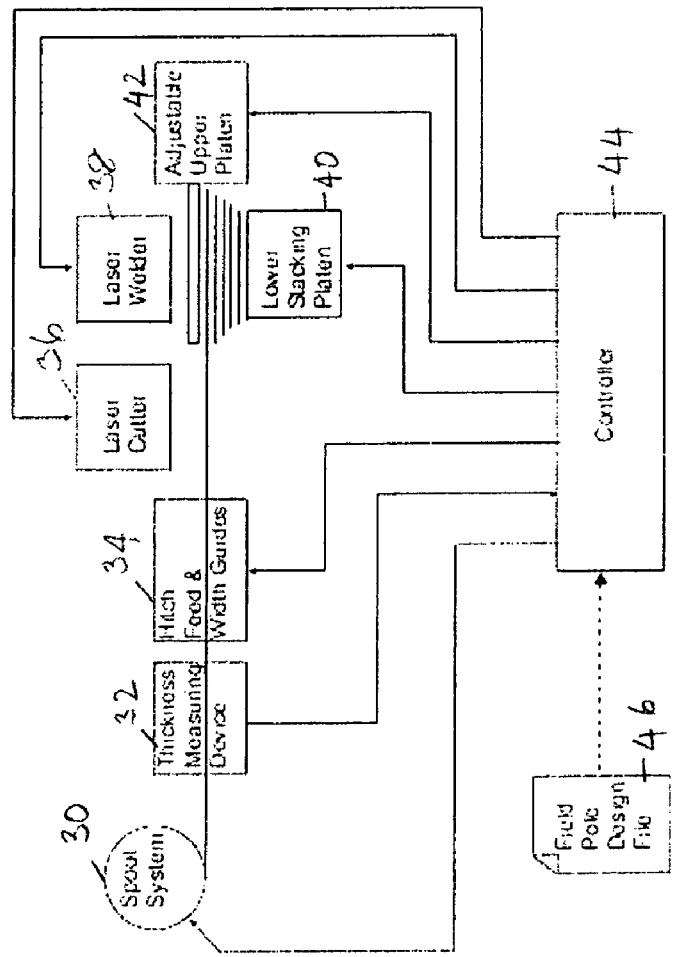
FIG. 5 is a schematic view of a laser based system for constructing a three-dimensional laminated shape of a field pole structure, in accordance with one embodiment of the invention.

FIG. 5 is a schematic view of a laser based system for constructing a three-dimensional laminated shape of a field pole structure, in accordance with one embodiment of the invention. The laser based system 28 generally includes a spool system 30, a thickness measuring device 32, a hitch feed and width guides system 34, a laser cutter 36, a laser welder 38, a lower stacking platen 40 and an adjustable upper platen 42. The spool system 30 includes multiple lamination strips of various widths. In one embodiment, the width of a lamination strip is selected in accordance with one or more lamination processing parameters. The lamination parameters may include, for example, a lamination width parameter, a lamination length parameter, a lamination air-gap face parameter, and a lamination weld pattern parameter. In one embodiment, a controller 44 coupled to the laser based system 28 performs a series of computer controlled operations to compute the lamination parameters for each lamination strip.

In operation, a lamination strip having a first lamination width is selected from the spool system 30 and is automatically fed into the hitch feed and width guides system 34. Movable horizontal width guides in the hitch feed and width guides system 34 are set to the proper spacing for each lamination strip and are used to guide the lamination strip into the proper position for processing. In one embodiment, the lamination strip from the spool system 30 passes through an in-line thickness measuring device 32 that is mounted before or within the hitch feed and width guides system 34. In one embodiment, the thickness measuring device 32 is configured to provide thickness information associated with each lamination strip, in real time, to the controller 44. The controller 44 is also coupled to a field pole design file 46 that includes design information characterizing the three-dimensional structure to be constructed. In one embodiment, the field pole design file 46 includes design information that defines the three-dimensional envelop of the desired field pole structure. The controller 44 also collects standardized width information associated with each of the lamination strips from the spool system 30. In one embodiment, the controller 44 includes executable instructions to compute lamination parameters for each lamination strip based on the thickness information, the design information and the width information. In a particular embodiment, the executable instructions to compute the lamination parameters include executable instructions to compute at least one of a lamination length, lamination width, lamination air-gap face shape and the lamination weld pattern for each lamination strip. The controller 44 further includes executable instructions to direct at least one of the spool system 30, the hitch feed and width guides system 34, the laser cutter 36 and the laser welder 38 to construct the three-dimensional laminated shape, based on the computed lamination parameters. The operations performed by the controller are discussed in greater detail in connection with FIG. 7.

Each lamination strip is advanced until the leading edge of the strip is just past the laser cutter 36. The lamination strip is held in place while the laser cutter 36 cuts the air-gap face of the lamination strip with a profile calculated from the field pole design file 46. As used herein, the term "air gap" refers to a space, or a gap, between a magnet surface and a confronting pole face in a field pole structure. Such a space can be physically described as a volume bounded at least by the areas of the magnet surface and the pole face. An air gap functions to enable relative rotation between a rotor and a stator, and to define a flux interaction region in an electro-mechanical device, such as an electric motor. Although an air gap is typically filled with air, it need not be.

In one embodiment, the lamination strip is advanced by the hitch feed and width guides system 34 by a distance calculated to determine a first lamination length for the lamination strip, based on the design information in the field pole design file 46. The adjustable lower platen 40 has the ability to move up and down in the vertical direction to enable the stacking of each cut lamination strip and to accommodate the accumulated stack height of the finished part as each new lamination strip is added. The initial lamination strip is held on the lower stacking platen 40 as the three-dimensional laminated shape is constructed. The lower stacking platen 40 could have a cutout to match the first lamination strip and magnetic attraction is typically used to hold the cut lamination strip in the proper location. Alternatively, the lamination strip is fastened to the lower stacking platen 40 by temporarily gluing or spot welding the lamination strip to the platen 40 and providing a release mechanism to eject the completed three-dimensional laminated shape when the stacking is completed. Once the initial lamination strip is fixed to the lower stacking platen 40, the laser cutter 36 creates the desired air-gap profile on the trailing edge of the initial lamination strip.

Operations to select, stack and cut a second lamination strip are then performed. Following the cutting the of the first lamination strip trailing air-gap profile, the laser cutter 36 creates the leading edge air-gap face on the end of the continuous lamination strip. The lower stacking platen 40 is moved down and the hitch feed and width guides system 34 advances the lamination strip to a calculated distance to create the proper length for the second lamination strip centered over the first lamination strip. In one embodiment, the second lamination strip has a lamination length that is greater than the initial lamination strip. The lower stacking platen 40 then pushes the lamination stack against the adjustable upper platen 42. The second lamination strip is then attached to the first lamination strip using the laser welder 38. In one embodiment, the laser welder 38 creates a programmable pattern of spot welds that are two laminations in depth. The adjustable upper platen 42 has cut outs to enable a laser beam to focus on the top of the second lamination strip. Once the second lamination strip is attached to the first lamination strip, the laser cutter 36 forms the trailing air-gap face based on the calculated profile specified by the field pole design file 46. The above process continues for as many lamination strips as the three-dimensional shape to be constructed needs for lamination strips having a first lamination width. When the last lamination strip having the first lamination width is stacked, this width of lamination material is withdrawn from the hitch feed and width guides system 34 and is rolled back on to the spool system 30.

A new lamination width is selected and the hitch feed and width guides system 34 is repositioned for this width of lamination stock. The lamination stock from the spool system 30 is advanced into the hitch feed and width guides system 34 and the above procedure is repeated. This process continues until each required lamination width is used and the entire desired three-dimensional laminated shape is fully constructed.

The disclosed technique of constructing a three-dimensional laminated shape using the laser based system has several advantages. The disclosed laser based system 28 is capable of high machine throughput since the laser cutting and welding operations can be performed very fast, typically in the range of 10's to 100's of milliseconds. Also, by starting with lamination strips of varying widths, there is no material lost from the edges of the strips. The only scrap generated is the cut off in the air-gap profiles on the leading and trailing edges of each lamination strip, which is very minimal compared to the 25-75 percent of material scrap generated by traditional stamping operations. Also, by using a laser cutter, the air-gap profile can evolve as the field pole structure is constructed and special features can be introduced at different locations in the faces of each lamination strip. In addition, the cutting and welding operations are performed on thin, magnetically permeable laminations, that carry high levels of flux and have low core losses. This enables the construction of three-dimensional laminated structures in a cost effective manner. Further, by accommodating thickness variations into the construction of the field pole structure as disclosed above, field poles of uniform shape, volume and weight may be constructed.

Figure 6:
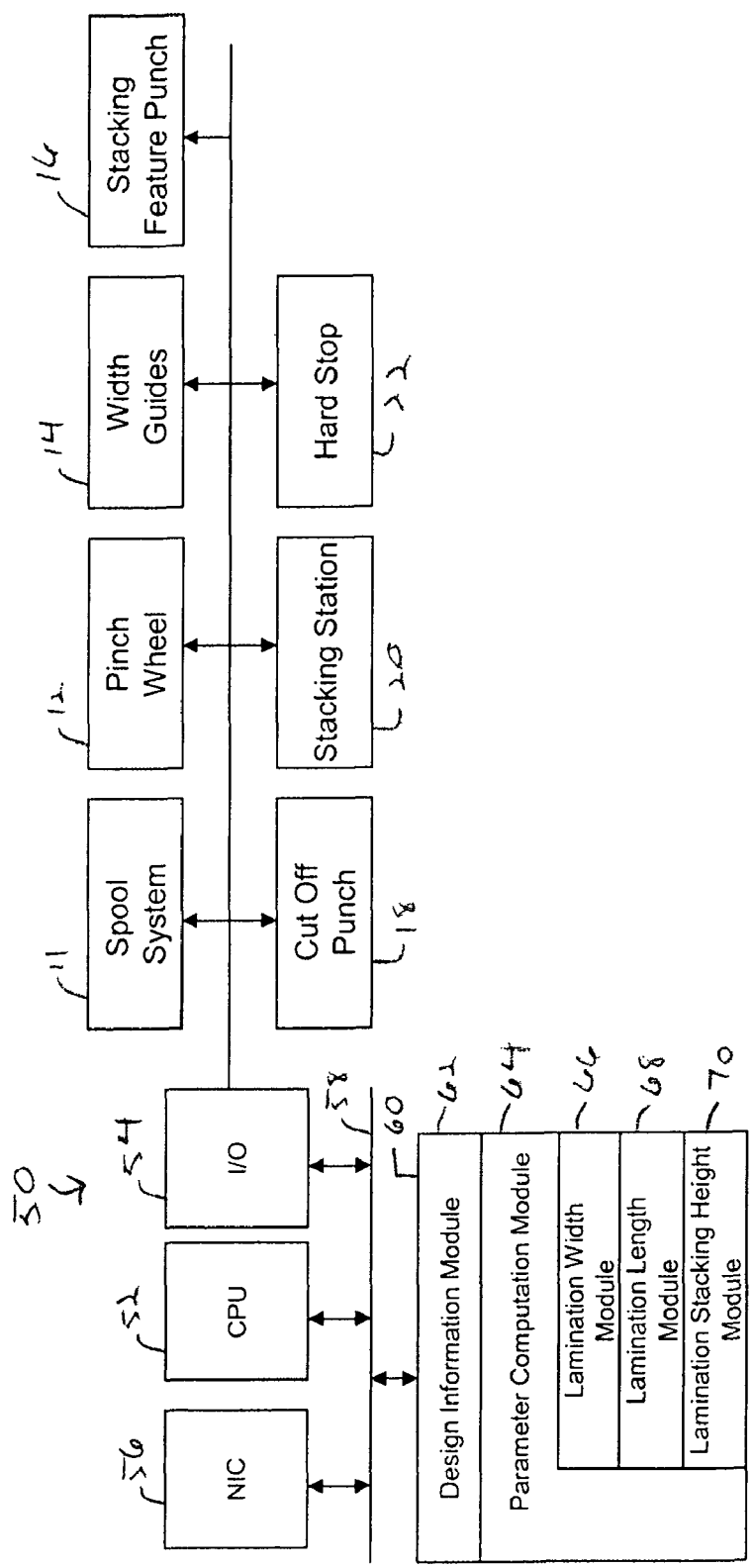
FIG. 6 illustrates a computer configured in accordance with embodiments of the present invention.

FIG. 6 illustrates a computer configured in accordance with embodiments of the present invention. In one embodiment, a computer 50 is coupled to the die punching system 10 illustrated in FIGS. 1, 2, 3. In a particular embodiment, the computer 50 is configured to perform a series of operations to compute lamination parameters for each lamination strip. The computer 50 further includes executable instructions to direct one or more components of the die punching system 10 to construct a three-dimensional shape of an electrodynamic device, based on the computed lamination parameters, in a manner as will be discussed in greater detail below. The computer 50 includes standard components, including a Central Processing Unit 52 and input/output devices 54, which are linked by a bus 58. The input/output devices 54 may include a keyboard, mouse, display, printer and machine interfaces. A network interface circuit (NIC) 56 provides connectivity to a network (not shown), thereby allowing the computer 50 to operate in a networked environment. A memory 60 is also connected to the bus 58.

In one embodiment, the memory 60 includes a design information module 62 and a parameter computation module 64. The design information module 62 includes design information characterizing a three-dimensional laminated shape. In one embodiment, the design information module 62 is the field pole design file 46. The design information module 62 may also include, for example, material thickness information and width information associated with the plurality of lamination strips. The parameter computation module 64 includes executable instructions to compute lamination parameters based on the design information. In a particular embodiment, the parameter computation module 64 includes a lamination width module 66, a lamination length module 68 and a lamination stacking height module 70. In one embodiment, the lamination width module 66 includes executable instructions to compute the lamination width for each of the lamination strips and provide the lamination width to the spool system 11 and to the width guides 14, via input/output devices 54. The lamination length module 68 includes executable instructions to compute the lamination length for each of the lamination strips and provides the lamination length to the pinch wheel drive 12, the hard stop 22 and the cut off punch 18. The lamination stacking height module 70 includes executable instructions to determine the height of the lamination in the assembled stack for each of the lamination strips and provide the height information to the stacking station 20 to control the vertical position of the stack. The computer also controls the stacking feature punch 16 (e.g., via the lamination length module 68). Overall, the computer controls all operations via the input/output devices 54. The particular modules displayed are exemplary. Their operations may be combined or further broken down into smaller modules. It is the operations of the invention that are significant, not the precise location or manner in which they are performed.

Figure 7:
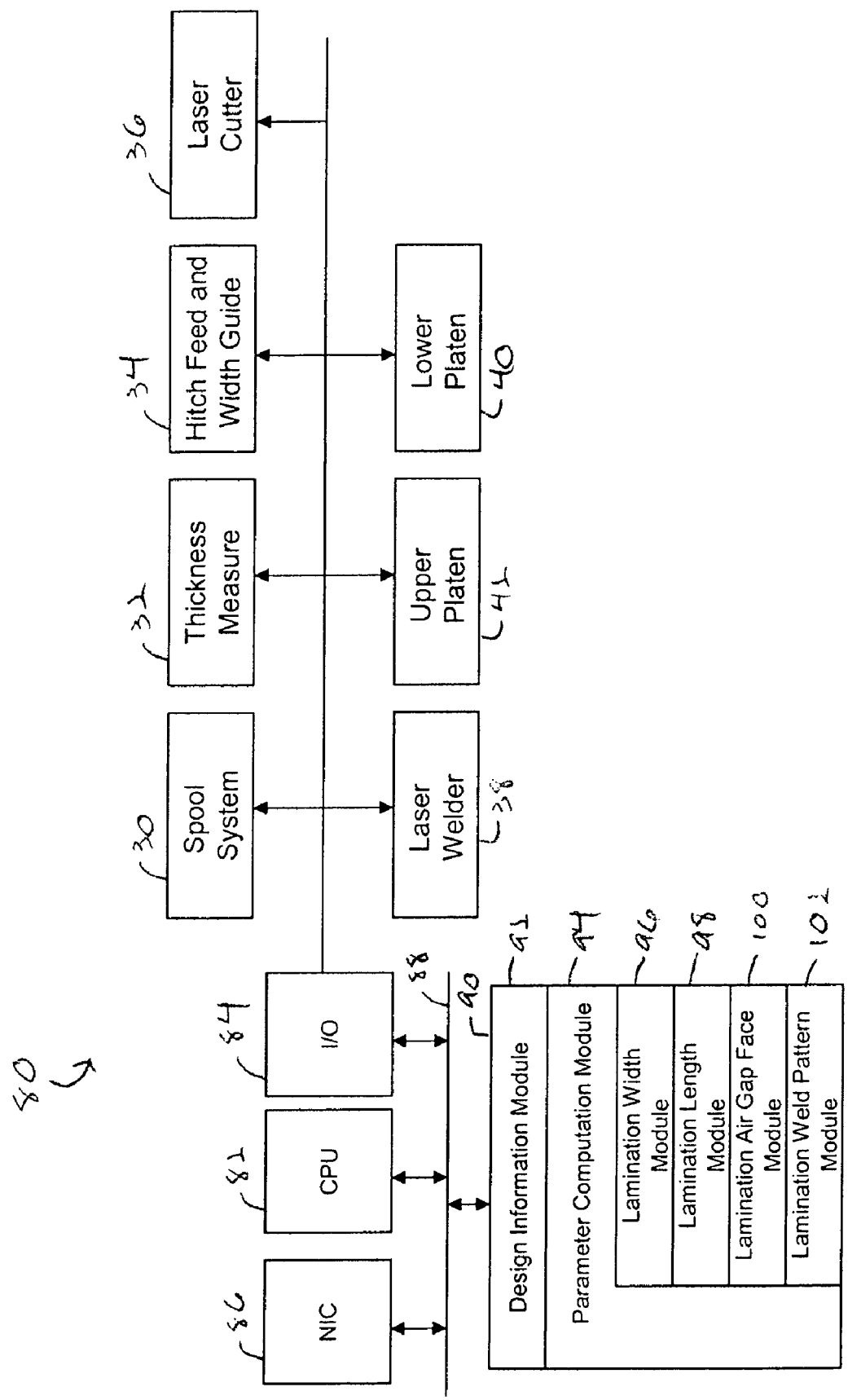
FIG. 7 illustrates a computer configured in accordance with another embodiment of the present invention.

FIG. 7 illustrates a computer configured in accordance with another embodiment of the present invention. In one embodiment, the controller 44 in the laser based system 28 further includes a computer 80 configured to perform a series of operations to compute lamination parameters for each lamination strip. The computer 80 further includes executable instructions to direct one or more components of the laser based system 28 to construct a three-dimensional shape of an electrodynamic device, based on the computed lamination parameters. The computer 80 includes standard components, including a Central Processing Unit 82 and input/output devices 84, which are linked by a bus 88. A network interface circuit (NIC) 86 provides connectivity to a network (not shown), thereby allowing the computer 80 to operate in a networked environment. A memory 90 is also connected to the bus 88.

In one embodiment, the memory 90 includes a design information module 92 and a parameter computation module 94. The design information module 92 includes design information characterizing a three-dimensional envelop of a desired field pole structure. In one embodiment, the design information module 92 is the field pole design file 46. The design information may also include material width information associated with the plurality of lamination strips in the spool system 30. The parameter computation module 94 includes executable instructions to compute lamination parameters based on the design information and real-time lamination thickness data from the thickness measurement system 32. The computation module 94 includes executable instructions to compute in real-time the location of each lamination within the overall three-dimensional volume based on the current lamination thickness reading and the accumulated thickness data from all previous laminations in the stack. In a particular embodiment, the parameter computation module 94 includes a lamination width module 96, a lamination length module 98, a lamination air gap face module 100 and a lamination weld pattern module 102. The lamination width module 96 includes executable instructions to compute the lamination width for each of the lamination strips and provide the lamination width to the spool system 30 and the hitch feed and width guides system 34. The lamination length module 98 includes executable instructions to compute the lamination length for each of the lamination strips and provides the lamination length to the hitch feed and width guides system 34 and upper platen 42. The lamination air gap face module 100 includes executable instructions to determine a lamination air-gap face contour for each of the lamination strips and provides the lamination air-gap face contour to the laser cutter 36. The lamination weld pattern module 102 includes executable instructions to determine a lamination weld pattern for each of the lamination strips and provides the lamination weld pattern to a laser welder 38. The computer also controls the sequencing of all of the stations, including the lower stacking platen 40.

It should be noted that the executable modules stored in memory 60 in computer 50 and memory 90 in computer 80 are exemplary. Additional modules, such as an operating system or graphical user interface module may also be included. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or server-side. It is the functions of the invention that are significant, not where they are performed or the specific manner in which they are performed.

Figure 8:
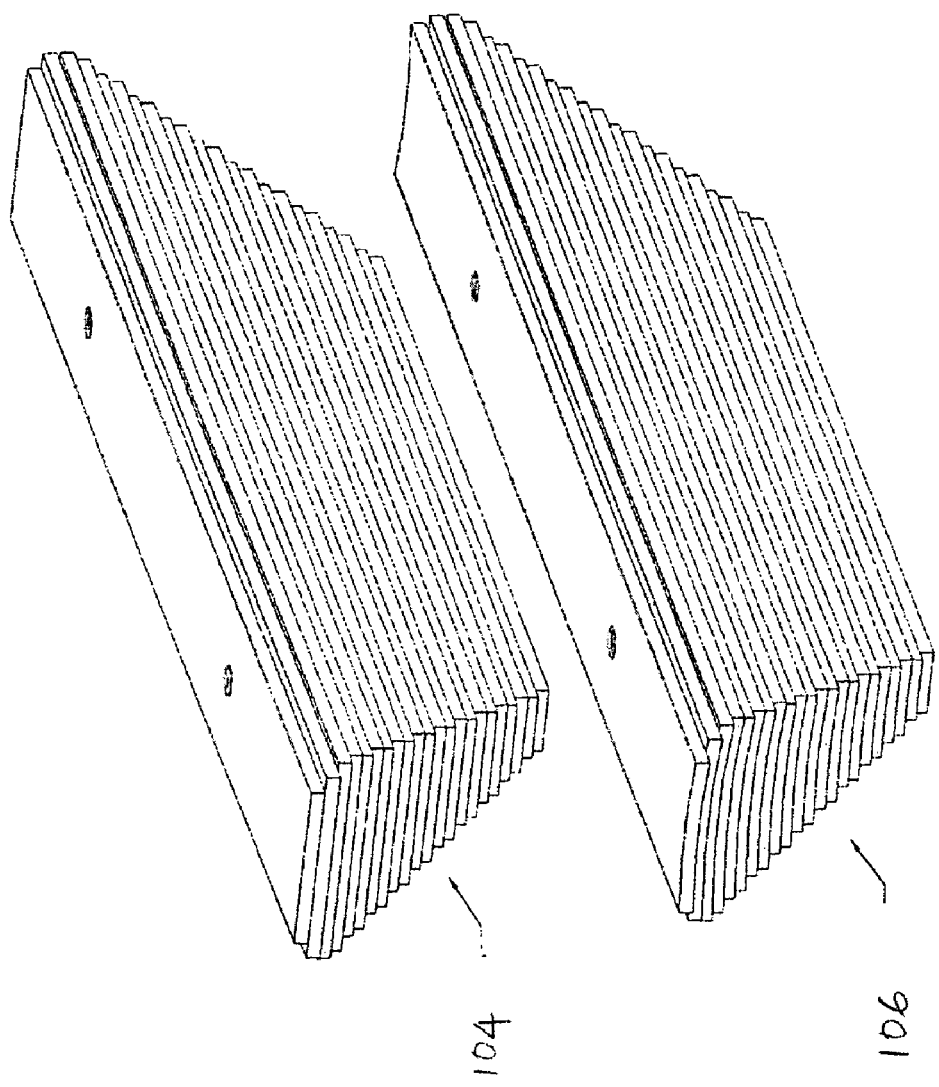
FIG. 8 illustrates exemplary three-dimensional laminated shapes constructed in accordance with embodiments of the present invention.
Figure 9:
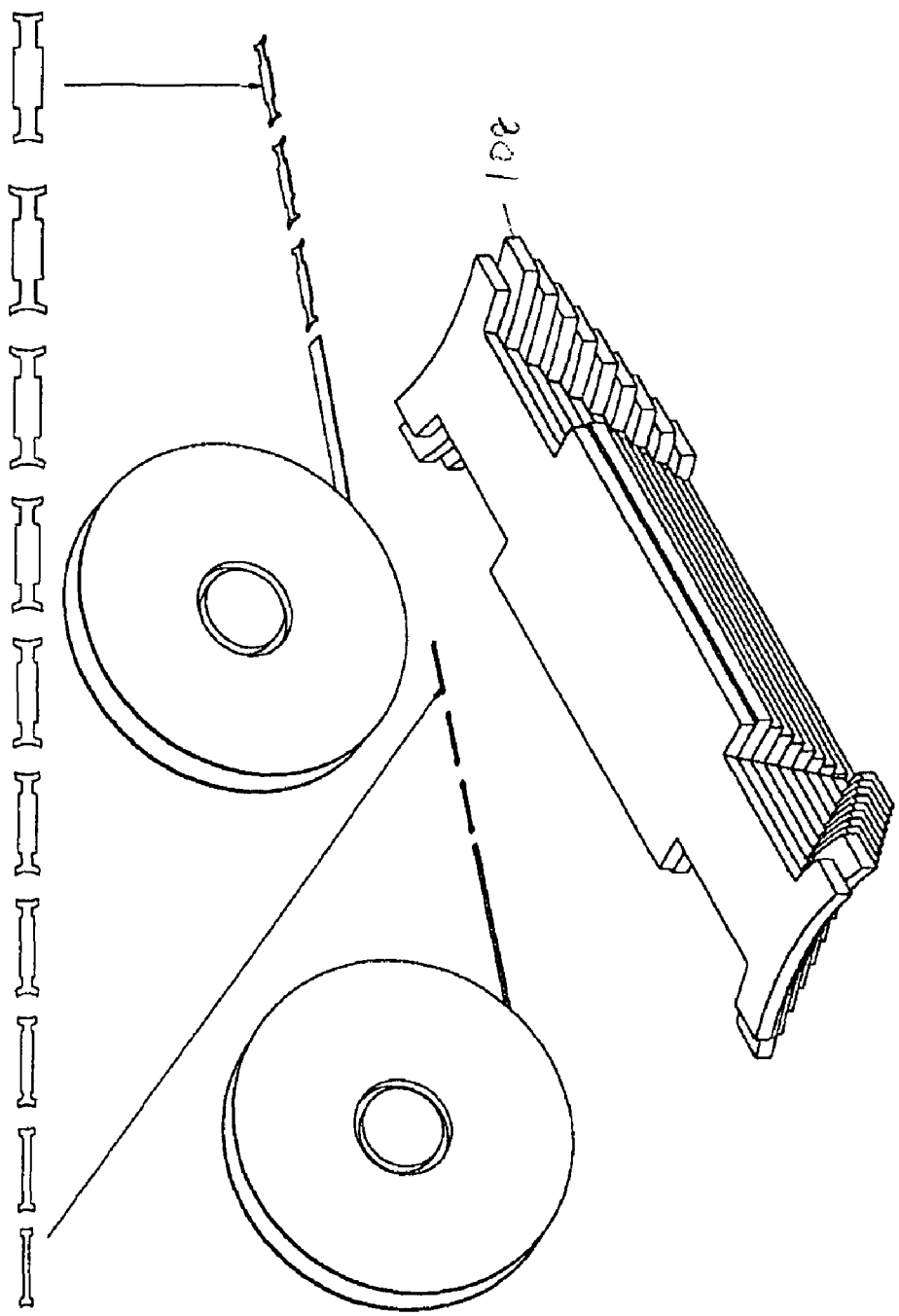
FIG. 9 illustrates the construction of an exemplary contoured field pole structure having wings, in accordance with one embodiment of the invention.

The disclosed embodiments may be used to construct three-dimensional structures of various shapes. FIG. 8 illustrates exemplary three-dimensional laminated shapes constructed in accordance with embodiments of the present invention. Reference numeral 104 illustrates a three-dimensional laminated shape having a flat cut face. Reference numeral 106 illustrates a three-dimensional laminated shape having a curved air-gap face. FIG. 9 illustrates the construction of an exemplary contoured field pole structure having wings, in accordance with one embodiment of the invention.

In one embodiment, a field pole structure having a curved front face that matches the conical shape of a rotor in an electrodynamic device, such as an electric motor may be constructed by using an oval shaped punch instead of a straight punch. In another embodiment, a contoured field pole structure may be constructed by adding multiple stages of movable side punches. The wings 108 achieve higher pole coverage while allowing windings of a reasonable thickness and reducing field pole-to-pole flux leakage.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method for constructing a three-dimensional laminated shape comprising:
   selecting a first lamination strip from a plurality of lamination strips with different widths assembled on a spool;
   stacking a first lamination strip on a stacking device;
   cutting the first lamination strip at a first lamination length;
   selecting a second lamination strip from the spool;
   stacking the second lamination strip on the stacking device;
   cutting the second lamination strip at a second lamination length different than the first lamination length to construct a three-dimensional laminated shape for a field pole, wherein the three-dimensional laminated shape includes a surface that matches the shape of a rotor of an electrodynamic device.

2. The method of claim 1, wherein the first lamination strip and the second lamination strip include punched stacking features.

3. The method of claim 1, wherein the first lamination strip and the second lamination strip include air gap face profiles.

4. The method of claim 1, wherein the first lamination strip and the second lamination strip are processed in accordance with lamination parameters selected from at least one of a lamination width parameter, a lamination length parameter, a lamination air-gap face parameter, a lamination stacking height parameter and a lamination weld pattern parameter.

5. The method of claim 1 further comprising laser welding the first lamination strip to the second lamination strip.

6. A system, comprising:
   a spool with a plurality of lamination strips with different widths; and
   a computer with executable instructions configured to:
      collect design information characterizing a three-dimensional laminated shape;
      compute lamination parameters based on the design information; and
      direct a plurality of components to construct a three-dimensional laminated shape of an electrodynamic device based on the lamination parameters, wherein the three-dimensional laminated shape comprises a plurality of lamination strips of different lamination widths and different lamination lengths, wherein the three-dimensional laminated shape includes a surface that matches the shape of a rotor of an electrodynamic device, and wherein a component of the plurality of components accesses the spool.

7. The system of claim 6, wherein the plurality of components comprise at least one of a hitch feed and width guides system, a laser cutter and a laser welder in a laser based system.

8. The system of claim 6, wherein the plurality of components comprise at least one of a pinch wheel drive, horizontal width guides, a punching station and a cut-off punch in a die punching system.

9. The system of claim 6, wherein the computer has executable instructions configured to:
   collect at least one of material thickness information and width information associated with the plurality of lamination strips, and
   compute the lamination parameters based on the material thickness information and the width information.

10. The system of claim 6, wherein the executable instructions to compute lamination parameters include executable instructions to compute at least one of a lamination width parameter, a lamination length parameter, a lamination air-gap face parameter, a lamination stacking height parameter and a lamination weld pattern parameter for each lamination strip.

11. The system of claim 6 comprising
   executable instructions to compute a lamination width for each of the lamination strips based on the lamination parameters, and
   provide the lamination width to at least one of a spool system and a hitch feed and width guides system.

12. The system of claim 6 comprising executable instructions to
   compute a lamination length for each of the lamination strips based on the lamination parameters, and
   provide the lamination length to a hitch feed and width guides system.

13. The system of claim 6 comprising executable instructions to
   compute lamination stacking heights for each of the lamination strips based on the lamination parameters, and provide the lamination stacking heights to a stacking station.

14. The system of claim 6 comprising executable instructions to
compute a lamination air-gap face contour for each of the lamination strips based on the lamination parameters, and
provide the lamination air-gap face contour to a laser cutter.

15. The system of claim 6 comprising executable instructions to
compute a lamination weld pattern for each of the lamination strips based on the lamination parameters, and
provide the lamination weld pattern to a laser welder.

16. The system of claim 6 further comprising executable instructions to generate laser weld instructions for a laser welder, which welds each new lamination strip to a previous lamination strip.

* * * * *